United States Patent [19]

Hense et al.

[11] Patent Number: 5,565,026
[45] Date of Patent: Oct. 15, 1996

[54] COMPOSITIONS WHICH SET IN THE PRESENCE OF WATER AND THEIR USE

[75] Inventors: Ulrich Hense, Landsberg/Lech; Peter Mauthe, Türkheim; Rudolf Hinterwaldner, Munich, all of Germany

[73] Assignee: Hilti Aktiengesellschaft, Liechtenstein, Germany

[21] Appl. No.: 470,371

[22] Filed: Jun. 6, 1995

Related U.S. Application Data

[63] Continuation of Ser. No. 208,922, Mar. 9, 1994, abandoned, which is a continuation of Ser. No. 814,148, Dec. 30, 1991, abandoned.

[30] Foreign Application Priority Data

Jan. 9, 1991 [DE] Germany .......................... 41 00 386.1

[51] Int. Cl.$^6$ ................................. C04B 7/02; C04B 7/13
[52] U.S. Cl. ........................... 106/600; 106/606; 106/692; 106/713; 106/714; 106/819
[58] Field of Search ...................... 106/600, 606, 106/692, 713, 819, 38.3, 721, 694, 714

[56] References Cited

U.S. PATENT DOCUMENTS

| | | |
|---|---|---|
| 4,357,167 | 11/1982 | Kellet et al. . |
| 4,640,715 | 2/1987 | Heitzmann et al. . |
| 4,935,060 | 6/1990 | Dingsoyr ................................. 106/719 |
| 5,228,913 | 7/1993 | Hinterwaldner et al. ............... 106/603 |

*Primary Examiner*—Paul Marcantoni
*Attorney, Agent, or Firm*—Anderson, Kill, Olick P.C.

[57] ABSTRACT

A 2-component composition is disclosed which contains an inorganic binder as well as a curing agent composed of water or an aqueous solution. The composition also contains substances which regulate solidification and curing, as well as, if necessary, conventional amounts of slag powders, fillers and blowing agents. The composition is distinguished by the fact that it cures rapidly even at low temperatures and can be used in small amounts. As a result, the composition is particularly suitable as a dowelling composition for fastening anchor rods in boreholes.

6 Claims, No Drawings

COMPOSITIONS WHICH SET IN THE PRESENCE OF WATER AND THEIR USE

This is a continuation application of Ser. No. 08/208,922, filed Mar. 9, 1994, abandoned, and which in turn is a continuation application of Ser. No. 07/814,148, filed Dec. 30, 1991, abandoned.

BACKGROUND OF INVENTION

This invention relates to a molding composition based on inorganic components which is set rapidly with water or an aqueous solution, even at low temperatures, and to its use.

U.S. Pat. No. 4,842,649, which corresponds to WO 88/00156 discloses hydraulically setting cement mixtures which solidify and set even at temperatures below the freezing point. These mixtures consist of Portland cements, fly ashes, metakaolinite and other aggregates. Compared to conventional compositions, compositions produced therewith set relatively quickly and reach a relatively high green strength after a few hours.

If this knowledge is transferred to compositions which are processed in small amounts, it turns out that the advantages cannot be identified and the method becomes ineffective. This is so, particularly when such compounds are used, for example, as repair mortars, levelling compositions and for long-wearing layers which are exposed to attrition. Moreover, there are applications in everyday construction practice, for which even shorter solidification and setting times are required for large-volume formulation and processing amounts, in order to achieve high green strength even earlier and at low temperatures. For this reason, the building industry, for different areas of application, has long been searching for compositions which set and cure rapidly, even at low temperatures and result in high green and ultimate strengths, in small as well as in large formulated amounts. Such inorganic compositions can then take the place of compositions which are based on organic resins and have become known under the name of polymer concrete. By so doing, they can make a contribution to the protection of the environment and to industrial hygiene.

SUMMARY OF THE INVENTION

It is an object of the invention to provide a molding composition which solidifies rapidly and cures within a short time.

It is another object of the invention to provide a molding composition which solidifies rapidly and cures within a short time, even at low temperatures, in small as well as in large volumes.

Still another object of the invention is to provide a molding composition which solidifies rapidly and cures within a short time without supplying additional energy from the outside.

These and other objects of the invention arise from the advantages thereof, which become evident from the following description.

It has been discovered that the objects of the invention are achieved by a curable 2-component composition which contains:

A) one or more inorganic binders selected from the group of a1) a mixture containing finely divided $SiO_2$ or finely divided $SiO_2$ and $Al_2O_3$, a2) aluminum silicate from the group of kaolinites or metakaolinites and/or a3) hydraulic binder;

B) a curing agent selected from the group of b1) water and/or b2) an aqueous solution, preferably selected from those containing at least partially water-soluble, alkali metal and/or ammonium silicate and/or a precursor thereof from the corresponding oxide or hydroxide, a solution containing amorphous silicic acid or any combination thereof;

C) a substance which regulates and/or accelerates solidification and curing, selected from the group of alkali metal and/or ammonium carbonates and/or inorganic and/or organometallic compounds, which, on contact with water, accelerate curing by means of the heat of reaction released and D) optionally, one or more conventional additive, such as slag powder, filler, blowing agent, etc.

DESCRIPTION OF THE INVENTION

The components of group A form the basis for the backbone polymers of the inventive compositions and preferred inorganic binders include combinations of: a1) and a2); a1) and a3); a2) and a3) and a1), a2) and a3). The inorganic binder is present in an amount ranging from 32.5% by weight of the total composition to 73% by weight of the composition. Finely divided $SiO_2$ or its mixture with $Al_2O_3$ contains at least 5% by weight of silica (a1).

If component a3), such as Portland cement, predominates, then components a1) and/or a2) contribute significantly to the modification of the rheological properties, solidification and curing properties and to reinforcement of the skeletal matrix. By means of these possible combinations, compositions can be produced which can solidify and/or cure according to the reaction mechanisms of hydraulic setting and/or polycondensation.

The components of group B act essentially as curing agents and enter the backbone polymer at least partially, depending on the reaction mechanism. The amount of curing agent present in the present composition ranges from 20 to 32.5% by weight.

The components of group C are additives for the molding compositions which serve to accelerate solidification and curing reactions. Multibasic organic carboxylic acids with at least two carboxyl groups in the molecule or their salts are preferred additives which can regulate the rheological properties before, during and after setting and, with that, also water management.

$SiO_2$, which is intended as component a1), preferably is present in amorphous and, particularly, in anhydrous form. This form is also preferred for the finely divided mixture of $SiO_2$ and $Al_2O_3$, even though the $Al_2O_3$ may also be partly present in crystalline form. $SiO_2$ may also originate from amorphous, water-containing silicic acid, similar to that frequently contained in partly soluble alkali metal and ammonium silicates.

The proportions by weight of $SiO_2$ and $Al_2O_3$ in the mixture preferably range from 5 to 80% by weight for $SiO_2$ and 95 to 20% by weight for $Al_2O_3$. The oxides of component A) may contain impurities as further components, such as Fe, Na, K, etc., in the form of their oxides or silicates or aluminates. These impurities generally are present in amounts totalling less than 15 or 10% by weight of the total mixture of the stone-forming component a1). Any noticeable content of alkaline earth oxides and/or hydroxides in the stone-forming components a1), such as in fly ash, can contribute to reducing the amount of curing regulators (C) added. Dusts from high temperature smelting processes, filter dusts, electrostatically deposited filter ash from high-temperature power plants and calcined, milled bauxites have proven to be particularly suitable.

In component a2), the kaolinite is present as $Al_2O_3 \cdot 2SiO_2 \cdot 2H_2O$ and the metakaolinite (dehydrated kaolinite) as $Al_2O_3 \cdot 2SiO_2$. Transition states are also usable. Metakaolinites are preferred, since these have a higher reactivity. The amount of a2) present ranges from 2.5% to 5% by weight.

Components of a3) are hydraulic binders; Portland cements are preferred. However, other binders of this class are also suitable. As has been surprisingly discovered, when hydraulic binders such as Portland cement are used, a minimum metakaolinite content is required in order to provide the cured composition with a higher durability.

As curing agent (B) for the backbone binder (A), water (b1) and aqueous solutions, particularly solutions of alkali metal and/or ammonium silicates (b2) are suitable. Alkali metal and/or ammonium silicates are particularly suitable as the curing agent for the backbone binder (a1). Such compounds may be used by themselves or in admixtures and, in general, have an excess of free alkali metal and/or ammonium. The molar ratio of alkali metal or ammonium to silicon dioxide generally is between 1.0 and 5.0 moles and preferably between 1.5 and 4 moles of $SiO_2$ per mole of alkali metal or ammonium. According to the invention, potassium and/or ammonium water glass are particularly preferred, because, particularly in conjunction with the additives described below, they not only accelerate polycondensation during the binding process, but also provide better and more homogeneous ultimate physical properties. The alkali metal or ammonium silicates can also be present in the form of aqueous preparations.

Instead of the silicates, the starting materials for the formation of the silicates can also be present, namely the appropriate oxides or hydroxides of the alkali metal or the ammonium and amorphous, disperse, powdery, water-containing silicic acid. Although both reaction components, the backbone binder (A) and the curing agent (B) are hygroscopic, one-component molding composition system can be prepared from them in addition to the two-component systems. When a water-impermeable or water vapor-impermeable packing material is used to separate A) and C) from B), mixtures which are ready for immediate use can also be prepared and packaged from the backbone binder and the accelerator (A and C) and the curing agent (B). Such mixtures are stable over several months of storage. At the site of use, the mixtures of (A) and dry alkali metal or ammonium silicates are mixed with the appropriate amount of water.

However, the molding composition can also be prepared and packaged as a 2-component system. For this purpose, a container is required for the hardener which is resistant to alkali metal and/or water.

Since the water in the polycondensing backbone binder portions in the molding composition systems of the invention has only vehicle and wetting functions, it can additionally assume the task and function of mixing water for the hydration in the presence of the hydraulic binder portion, in order to initiate setting. By these means, at least the bulk of the water is bound initially, as a result of which molding compositions with few or no pores and higher strength result after curing. However, short curing times, especially at low temperature, are also achieved due to the low water/binding agent factor.

A further possibility for a one-component molding compositions involves the use of water impermeable and water vapor-impermeable packing . material, which contains the components (A) and (C) as powdery mixtures, as well as at least partially soluble alkali metal and/or ammonium silicates or their precursors, also in solid form.

Substances (C) for regulating and/or accelerating solidification and curing which are used according to the present invention are substances with accelerating properties and originate from the group of alkali metal and/or ammonium carbonates and/or inorganic and/or organometallic compounds, which, on contact with water, exert an accelerating effect on the solidification and curing reaction, their heat of reaction preferably being 500 joule/g.

Compounds suitable as components C) originate preferably from the following groups:

alkali metal and ammonium carbonates, particularly lithium carbonate;

group 2 of the periodic system, such as anhydrous alkaline earth and magnesium oxides, including, for example, calcium, barium and strontium oxides;

clinker phases from the manufacture of cements, for which purpose Alite ($C_3S$) and tricalcium aluminate ($C_3A$) are particularly suitable (compare cement literature, C= calcium oxide, S= silicon dioxide and A=aluminum oxide);

aluminum silicates and lithium silicates; anhydrites;

metal carbides of the general formula $M^I{}_2C_2$ or $M^{II}C_2$, such as calcium carbide ($CaC_2$) and iron carbide ($Fe_3C$);

metal alkylenes of the general formula $MnR_n$, such as triisobutyl aluminum;

metal amides, metal imides and metal nitrides of the general formula $MNH_2$, $M_2NH$ and $M_3N$, such as sodium or lithium amide;

metal azides of the general formula $XN_3$, wherein X represents a metal cation, such as sodium azide;

organic azides of the general formula $RN_3$, wherein R is an alkyl, aryl and/or an acyl group;

metal carbonyls from the group comprising monocyclic or polycyclic coordination compounds, in which the carbon monoxide molecules are linked coordinately to metal atoms, such as disodium tetracarbonyl ferrate;

metal hydrides, which include the stoichiometric metal hydrides, such as the hydrides of the alkali and the alkaline earth metals, the high polymeric hydrides, such as those of aluminum, beryllium and magnesium, and the so called complex hydrides, such as the alanates and boranates; and ammonium nitrates and nitrites.

It is of decisive importance for the suitability of a compound as component C) for the purposes of the present invention, that it undergo exothermic reaction on contact with water or exhibit stone-forming, reaction-accelerating heat of reaction, particularly of 500 joule/g.

The heats of hydration of the following compounds, which are given by way of example, make this clear:

| | |
|---|---|
| $C_3S$ | 500 J/g |
| $C_3A$ | 1350 J/g |
| MgO | 850 J/G |
| CaO | 1160 J/g |

| | |
|---|---|
| -continued | |
| NH₄NO₃ | 1571 J/g |

As possible components that affect the rheology, dibasic and multibasic carboxylic acids or their alkali and/or alkaline earth salts, such as citric acid, come into consideration. With these carboxylic acids, the flow properties can be maintained while the proportion of mixing water is reduced, the mixing time is shortened and, if necessary, the hydration reactions in the hydraulically setting part are retarded.

It is a further distinguishing characteristic that, on addition of already very small amounts of kaolinites or metakaolinites, the proportion of hydraulic setting agents can be significantly higher, which then fulfill additive functions to accelerate the reaction.

The most suitable hydraulic binders of the present invention include Portland cement, blast furnace slag cement, trass cement, oil shale cement, aluminous cement and also so called "hydraulic lime" or pozzolans.

When binder mixtures from combinations of components a1) and a3) or a1), a2) and a3) are used in the compositions of the invention, that is, in the presence of polycondensing and hydraulically setting components, surprisingly, it has turned out that the hydraulic binder portion sets particularly rapidly, if the inventive additives from the group of alkali metal carbonates, particularly potassium and/or lithium salts of the carboxylic acid, water glasses, fluorosilicic acid, aluminates and/or borates are present in amounts of 0.05 to 15.0% by weight and preferably of 0.1 to 8% by weight, based on the hydraulic binder portion.

Moreover, the binder/water factor influences the ultimate properties of the inventive compositions. Since the ultimate properties are improved when the amount of mixing water is reduced, although the mixing and rheology of the compositions are adversely affected, small amounts of the above organic acids can be added. Since these acids also provide setting-retardation properties, the amount added generally is 0.1 to 5% by weight, based on the dry binder portion in the inventive compositions.

Even though the heat of hydration is appreciable when one or several of the components from groups A) and B) are mixed in the presence of water, a series of synergistic effects may be observed during solidification and curing, particularly in the presence of additives from group C).

Surprisingly, it has been found that accelerated polycondensation, hydration and/or setting is obtained after water is mixed with the backbone binders, which set by way of polycondensation and/or hydraulic reactions, even if the setting temperature in a 100 g batch is 20° C., particularly 10° C. and preferably 0° C. On the other hand, compositions, which contain only one component from the A) and B) groups, exhibit only partial polycondensation and setting behavior and in some cases are still soft even after days. Accordingly, depending on the components selected from a1), a2) and a3), in conjunction with the components selected from b1) and b2), as well as the additives chosen from C), the polycondensation, hydration, solidification and sitting rates can be varied within wide limits, particularly in the case of small batch quantities. In this connection, a differentiation is made as in the case of organic polymer concretes, between pot life (flowability), green strength and ultimate strength. Accordingly, filled and unfilled molding compositions can be produced with components from A), B) and C), which have the following advantages:

a pot life between 5 seconds and 60 minutes, even at low temperatures;

green strengths, that is 50% of the ultimate strengths, between 5 and 120 minutes, even at low temperatures; and ultimate strengths of ≧90% after 15 and 240 minutes of setting time.

If compounds from group C) which form gases or swell up on contact with water are used as inventive additives, interesting and stable foam structures can be produced with the help of such compounds. For this purpose, those additives are preferred, which, like calcium carbide, for example, aside from forming a gas on contact with water, act initially as a reaction accelerator and are subsequently integrated into the set backbone binder matrix.

The amount of additives included depends on the temperature range in which they are used, the setting rate and the ultimate desired strength and generally falls within the range of 0.1 to 25% by weight and preferably in the range of 1 to 20% by weight and particularly in the range of 2 to 15% by weight, based on the backbone binder used.

Aside from the "gaseous" by-products which are formed from the inventive additives and act as blowing swelling agents, foamed objects can also be produced from the inventive molding compositions. For this purpose, the following compounds can be used, for example, as foaming agents: hydrogen peroxide, inorganic and organic per compounds, chemical blowing agents, such as azodicarbonamide, hydrazine derivatives, semicarbazides, tetrazoles and benzoxazines.

Foams from molding compositions which set according to the invention can also be produced by the introduction of gases, such as air, nitrogen and carbon dioxide, during the pot life phase. This technique is of interest particularly when molded objects of low volume, particularly those with a volume ≦100 cc, are to be produced, as is the case particularly with dowelling compositions in fastening technology. This stream of gas can be heated additionally, as a result of which the polycondensation and setting are accelerated and/or the amounts of inventive additives added can be reduced.

Moreover, fillers, pigments, dyes, thixotropic agents and also other additives to regulate the rheological properties, the wetting, etc., can be incorporated in the inventive molding compositions. However, additives to improve the adhesion, such as physical and/or chemically setting synthetic resin dispersions, such as those based on polyvinyl acetate, acrylate compounds, methacrylate compounds, polyester compounds and their copolymers are also possible.

Among particularly suitable fillers are those which are based on silicon dioxide, such as quartz powder, silica and aluminum oxide such as corundum powders and granulates. Surprisingly, it has been found that since these fillers may have a partially amorphous part, they contribute to reinforcing the set molding composition matrix. Of course, fiber materials from organic polymers, such as aramide, polyethylene and polypropylene can also be used to reinforce the matrix.

There are broad areas of use for the inventive molding compositions, particularly in building construction, underground engineering and the mining industry, as well as in artisan and domestic worker areas. The water-containing, flowable and/or thixotropically adjusted pastes from these backbone binders, which are produced with curing agents, can be processed like normal cement-lime mortar and polymer concretes and also assume their functions and tasks in many applications. Since the properties of the molding compositions, which set according to the invention, can be adjusted variably within relatively wide limits, the formulations can be varied so as to set rapidly, at a moderate rate or slowly, even at low temperatures. Accordingly, dowelling compositions for fastening applications, as well as mortar compositions for all of the building and mining industries can also be prepared on this basis.

A highly preferred application is the use of compositions of the invention as dowelling compositions for fastening anchor rods in boreholes. Such dowelling compositions are used particularly in the form of two-chamber or multi-chamber cartridges, water or an aqueous solution being contained separately from the materials that react with water or require water for the reaction.

A further embodiment of the invention involves the arrangement of water or aqueous solutions in microcapsules, which are dispersed in the powdery material requiring water for the reaction.

In general, those compositions which contain, in the presence of water, stone-forming components with aluminum silicates of the kaolinite and the metakaolinite type can be used as dowelling compositions for fastening anchor rods in boreholes.

Since foamed objects can also be produced from the molding compositions of the invention, the molding compositions can also be used economically for filling cavities. The foams produced therewith are distinguished by a high stability under pressure and a low specific gravity and can be used as noise and heat insulation.

The molding compositions of the invention can be processed in well known, conventional, commercial 2-component processing apparatuses, such as mixing guns, mixing and metering apparatuses for polymer concretes, as well as in so-called 2-chamber systems. However, simple mixing of the two components in one pot at the site of use, a procedure that corresponds to present building practice, is also possible.

On the basis of these inventive binder mixtures, a molding composition which is based on an inorganic backbone binder that sets in the presence of water has been made available. This molding composition is distinguished by the following advantages and improvements:

can be processed easily;

is friendly to the environment and to ecology;

the mixing ratios of the 2-component systems are not critical;

the pot life and the setting times can be varied;

can be processed even at temperatures below 0° C.;

sets rapidly at temperatures $\leq 20°$ C.;

sets under water;

is not combustible; and is exceptionally economic in comparison with the polymer concretes based on organic polymers.

The properties of the cured molding compositions include the following:

early green and ultimate strengths, e.g. after 30 minutes;

not combustible, that is, no flue gas is evolved;

resistant to solvents, weak and strong alkalies and sulfuric acid;

surface hardness adjustable to between 3 and 8 mohs;

specific gravity of
   compact compositions: 1,600–3,500 kg/m$^3$
   foamed compositions: 200–1,000 kg/m$^3$;

bending strength: 10–40 MPa, adjustable;

compression strength: 20–100 MPa, adjustable;

modulus of elasticity: 10,000–50,000 MPa;

coefficient of linear thermal expansion: 1 to $8\times10^{-6}/k^{-1}$;

high vibration absorption;

high dimensional stability at elevated temperatures;

low creep in comparison with polymer concretes;

high bond strength when used as a compound mortar and/or a dowelling composition; and high aging stability.

The following examples further illustrate the best mode currently contemplated for carrying out the invention, but the examples must not be construed as limiting the invention in any manner.

EXAMPLES

The following components were used to prepare molding compositions of the invention in Examples 1 to 5.

Oxide Mixture (a1)

No. 1:

39.0% by weight SiO$_2$
24.0% by weight Al$_2$O$_3$
22.0% by weight CaO
4.6% by weight MgO
0.6% by weight SrO
2.5% by weight Na$_2$O
0.5% by weight K$_2$O
5.4% by weight Fe$_2$O$_3$
1.0% by weight TiO$_2$
0.4% by weight SO$_3$ No. 2:

40.0% by weight SiO$_2$
60.0% by weight Al$_2$O$_3$

Aluminum Silicate (a2)

metakaolinite (Al$_2$O$_3$.2SiO$_2$)

Hydraulic Binder (a3)

Portland cement 45 F

Curing Agent Solution b2

20.00% by weight SiO$_2$
20.88% by weight K$_2$O
59.12% by weight water

A concrete of quality class C 20 with βw 38 N/mm$^2$ and ungalvanized M 12/12.9 anchor rods was used to test the molding compositions.

EXAMPLES 1 to 5

The dry components comprising the oxide mixture, the aluminum silicate, the cements, the curing regulators and the fillers were mixed in a powder mixer to a homogeneous dry mixture. After that, the hardener solution and/or the water was added to a beaker and the prescribed amount of solids from the dry mixture was added in portions and stirred with a high-speed stirrer. In each case, the amount formulated was 200 g. The homogeneous mortar paste was poured into boreholes, which had previously been prepared in the above concrete and had a diameter of about 13.2 mm and a depth of 110 mm, so as to fill them to ⅔ of their height. Subsequently, anchor rods of the above quality class were pressed into the respective mortar bed.

The compositions of the molding compositions and the characteristic data determined therewith are summarized in Table 1.

TABLE 1

| | | Example | | | | |
|---|---|---|---|---|---|---|
| | Unit | 1 | 2 | 3 | 4 | 5 |
| Oxide Mixture (a1) | | | | | | |
| No. 1 | % by wt. | 30.0 | — | 10.3 | 25.0 | 18.0 |
| No. 2 | % by wt. | — | 25.0 | 10.0 | 5.0 | 18.0 |
| Metakaolinate (a2) | % by wt. | 5.0 | 5.0 | 4.0 | 2.5 | 3.7 |
| Portland Cement (a3) | % by wt. | 38.0 | 41.4 | 10.0 | — | 5.3 |
| Curing Agent (B) | | | | | | |
| Water (b1) | % by wt. | 25.0 | 10.0 | 10.0 | 2.5 | 5.0 |
| No. 1 (b2) | % by wt. | — | 15.0 | 15.0 | 30.0 | 15.0 |
| Curing Regulators (C) | | | | | | |
| Lithium carbonate | | 1.2 | 1.0 | 0.1 | — | — |
| Calcium oxide | | — | 2.5 | 5.4 | — | 5.0 |
| Calcium carbide | % by wt | — | — | — | 2.4 | — |
| Citric acid | | 0.8 | 0.1 | 0.2 | 0.8 | 1.8 |
| Filler (D) | % by wt. | — | — | 35.0 | 34.3 | 28.2 |
| Quartz sand 0.1–0.25 mm | | | | | | |
| Pot Life/23° C. | min. | 6–8 | 5 | 5 | 15 | 7 |
| Green Strength/ 23° C./after | min. | 10 | 8 | 5 | 80 | 10 |
| Bond Strength/ 23° C./after | min. | 60 | 50 | 40 | 240 | 50 |
| Green Strength/ +5° C./after | min. | 25 | 30 | 70 | 160 | 20 |
| Bond Strength/ +5° C./after | min. | 120 | 120 | 100 | 360 | 110 |
| Pull-out Value/M 12 - Anchor rod | kN | 28 | 32 | 50 | 45 | 45 |

We claim:

1. A curable inorganic dowelling composition for fastening anchor rods in boreholes, consisting essentially of:
    A) 32.5–73% by weight of an inorganic binder comprising:
        a1) finely divided $SiO_2$ or its mixture with $Al_2O_3$, containing at least 5% by weight of $SiO_2$;
        a2) optionally aluminum silicate selected from the group consisting of kaolinite and metakaolinite; and
        a3) a hydraulic binder;
    B) 20–32.5% by weight of a curing agent selected from
        b1) water, and
        b2) an aqueous solution of alkali metal silicate, ammonium silicate, alkali metal oxide, ammonium hydroxide, amorphous silicic acid or any combination thereof;
    C) a curing accelerator selected from a member of the group consisting of CaO, MgO, Alite clinker phase ($C_3S$), tricalcium aluminate clinker phase ($C_3A$), CaC2; and
    D) a compound selected from the group consisting of a filler, blowing agent and any combination thereof.

2. The dowelling composition of claim 1, wherein the hydraulic binder is cement.

3. The dowelling composition of claims 1 or 2, wherein the finely divided $SiO_2$ is amorphous $SiO_2$.

4. A dowelling composition for fastening anchor rods in boreholes consisting essentially of a mixture containing, in the presence of water,
    2.5% to 5% by weight of kaolinite, metakaolinite or a combination thereof;
    30.3–68% by weight of a stone-forming inorganic binder selected from the group consisting of finely divided $SiO_2$ and hydraulic binder;
    2.5–30% by weight of a curing agent;
    0.1–5.4% by weight of a curing accelerator selected from a member of the group consisting of CaO, MgO, Alite clinker phase ($C_3S$), tricalcium aluminate clinker phase ($C_3A$), $CaC_2$; and
    the remainder being selected from the group consisting of a filler, foaming agent and a combination thereof.

5. The dowelling composition of claim 4, wherein the hydraulic binder is cement.

6. The dowelling composition of claim 4, wherein the finely divided $SiO_2$ is amorphous $SiO_2$.

* * * * *